United States Patent [19]

Suzuki et al.

[11] Patent Number: 4,621,677
[45] Date of Patent: Nov. 11, 1986

[54] HEAT EXCHANGER FOR INTERNAL COMBUSTION ENGINE EXHAUST, WITH NOISE SUPPRESSOR

[75] Inventors: Shigeo Suzuki, Hirakata; Tatsuo Fujita, Moriguchi, both of Japan

[73] Assignee: Kogata Gasu Reibo-Gijutsu Kenkyu Kumiai, Tokyo, Japan

[21] Appl. No.: 827,210

[22] Filed: Feb. 4, 1986

Related U.S. Application Data

[63] Continuation of Ser. No. 612,806, May 22, 1984, abandoned.

[30] Foreign Application Priority Data

| | | | |
|---|---|---|---|
| May 25, 1983 | [JP] | Japan | 58-92923 |
| Jun. 7, 1983 | [JP] | Japan | 58-102076 |
| Jul. 20, 1983 | [JP] | Japan | 58-133170 |
| Nov. 9, 1983 | [JP] | Japan | 58-210133 |

[51] Int. Cl.⁴ .......................................... F28F 13/08
[52] U.S. Cl. ..................................... 165/135; 165/51; 165/145; 165/159; 181/283
[58] Field of Search ............... 181/283, 272; 165/51, 165/135, 145, 159; 60/320

[56] References Cited

U.S. PATENT DOCUMENTS

| | | | |
|---|---|---|---|
| 1,724,559 | 8/1929 | Butler | 181/283 X |
| 1,745,492 | 2/1930 | Kelch et al. | 165/51 |
| 2,046,252 | 6/1936 | Davis | 181/283 |
| 3,280,903 | 10/1966 | Stoddard, Jr. | 165/135 |
| 3,404,731 | 10/1968 | Cushman | 165/51 |
| 3,760,870 | 9/1973 | Guetlhuper | 165/159 X |
| 4,450,932 | 5/1984 | Khosropour et al. | 181/283 X |
| 4,484,659 | 11/1984 | Buchwalder | 181/272 X |

FOREIGN PATENT DOCUMENTS

| | | | |
|---|---|---|---|
| 2909530 | 9/1980 | Fed. Rep. of Germany | 181/283 |
| 2143023A | 1/1985 | United Kingdom | 165/158 |
| 0705132 | 12/1979 | U.S.S.R. | 181/272 |

Primary Examiner—Albert W. Davis, Jr.
Assistant Examiner—Randolph A. Smith
Attorney, Agent, or Firm—Cushman, Darby & Cushman

[57] ABSTRACT

A heat exchanger also serving for suppressing exhaust gas noise includes a water jacket, a water inlet header and a water outlet header together surrounding the exhaust gas flow space and a plurality heat exchanging water tubes connecting the inlet header and outlet header are provided through the gas flow space and partition walls having gas-passing connection holes is provided to partition the gas flow pass into at least two parts of mutually differing volume.

7 Claims, 13 Drawing Figures

HEAT EXCHANGER FOR INTERNAL COMBUSTION ENGINE EXHAUST, WITH NOISE SUPPRESSOR

This is a continuation of application Ser. No. 612,806, filed May 22, 1984, which was abandoned upon the filing hereof.

BACKGROUND OF THE INVENTION

1. Field of Technology

The present invention relates generally to a heat exchanger for application to an apparatus for collecting heat from exhaust gas of such a machine as to produce noise when operating, and more particularly to thermal exchanger which can also attain silencing noise from exhaust gas of the machine when operating.

2. Description of the Prior Art

Recently, a heat pump apparatus driven by an internal combustion engine has been combined with a heat exchanger for collecting heat from its exhaust gas to heat liquid such as water. In such combined heat pump and heat exchanging apparatus, collection with high efficiency of heat from the exhaust gas, and suppressing of noise of the exhaust gas are important problems to be solved. Hitherto, apparatus for collecting heat from the exhaust gas and apparatus for suppressing noise of the exhaust gas are provided as separate apparatuses, and accordingly not only the space occupied by the apparatuses was large, but also noise of exhaust gas and noise transmitted through outer shell of a muffler were considerable. Furthermore, the usual resonance type muffler used for suppressing low frequency components of exhaust noise of the internal combustion engine is effective only for a predetermined revolution speed of the engine. Furthermore, in view of heat exchange efficiency, the conventional heat exchanger usually has an expanded heat exchanging surface, such as fins in the flow path of the exhaust gas, or only comprises a simple plate partition between the liquid and gas. However, such configurations of heat exchanger cannot satisfactorily exchange heat by utilizing the pulsive flow of the exhaust gas. And furthermore, there is a problem that when high efficiency of heat recovery is intended the exhaust gas is condensed, and in case of the exhaust gas of the internal combustion engine which includes strong acid resulting from nitrogen oxides in the exhaust gas is liable to corrode the fins or plates, thereby deteriorating the heat exchanging performance of these components and also deteriorating efficiency of the heat exchanger by choking of the flow-path of the exhaust gas by the corroded substances.

SUMMARY OF THE INVENTION

The principal purpose of the present invention is to provide an efficient heat exchanger suitable for use for heat exchange of exhaust gas from an internal combustion engine with efficient function of suppressing combustion noise.

The heat exchanger in accordance with the present invention comprises a casing which has a liquid jacket disposed immediately inside an outer shell of the casing, cylindrically surrounding an inside space therewith, an inlet header disposed immediately inside the outer shell at one end face of the casing and connected to the liquid jacket, an outlet header disposed immediately inside the outer shell at the other end face of the casing, the liquid jacket, the inlet header and the outlet header together surrounding the inside space isolatedly from the outer shell thereby defining a gas flow space, plural heat exchange tubes connecting the inlet header and the outlet header, with their outer surfaces exposed in the gas flow space, a liquid inlet connected to the liquid jacket, a liquid outlet connected to the outlet header, a gas inlet connected to a part of the gas flow space, a gas outlet connected to the other part of the gas flow space, and at least one partition for dividing the gas flow space into at least two partitioned spaces disposed sequentially of longitudinal direction of the heat exchange tubes, the partition having at least one gas-passing connection holes.

The heat exchanger in accordance with the present invention can perform efficient heat exchange by effectively utilizing the nature of pulsive flow of the exhaust gas, and also can suppress combustion noise by providing a configuration in which the liquid jacket, inlet header and outlet header surround a gas flow space inside of them, thereby achieving effective heat exchange without the use of conventional problematic fins.

Furthermore, one embodiment comprising resonation space therein has further satisfactory noise suppressing effect. Furthermore, the configuration of the present invention is suitable to provide multiple-stage abrupt enlarged section configuration, thereby enabling effective suppression of combustion noise on all the frequency ranges, and the configuration for abrupt enlargement of section and abrupt contraction also provides the synergetic effect of utilizing turbulance of the gas for efficient heat exchange. The heat exchanger in accordance with the present invention has a very simple and compact configuration. Furthermore, by draining the condensed water from the hot gas, so as to easily take out the condensed water from the gas flow space, the heat exchanger in accordance with the present invention has sufficient durability against acidic condensed water from the hot gas when applied to the exhaust gas of the internal combustion engine.

DETAILED DESCRIPTION OF THE PREFERRED EMBODIMENTS

Figure 1:
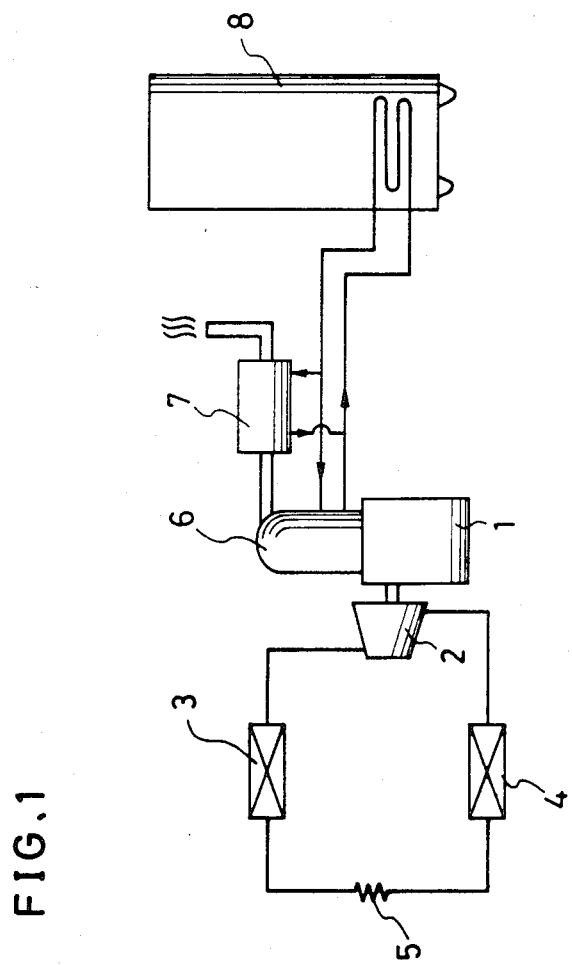
FIG. 1 is a diagram of a gas engine heat pump system in which the heat exchanger of the present invention is used.

Features of the present invention are described in detail in respect to preferred embodiments with reference to the attached figures. FIG. 1 shows general configuration of a system in which the heat exchanger in accordance with the present invention is used.

Figure 2:
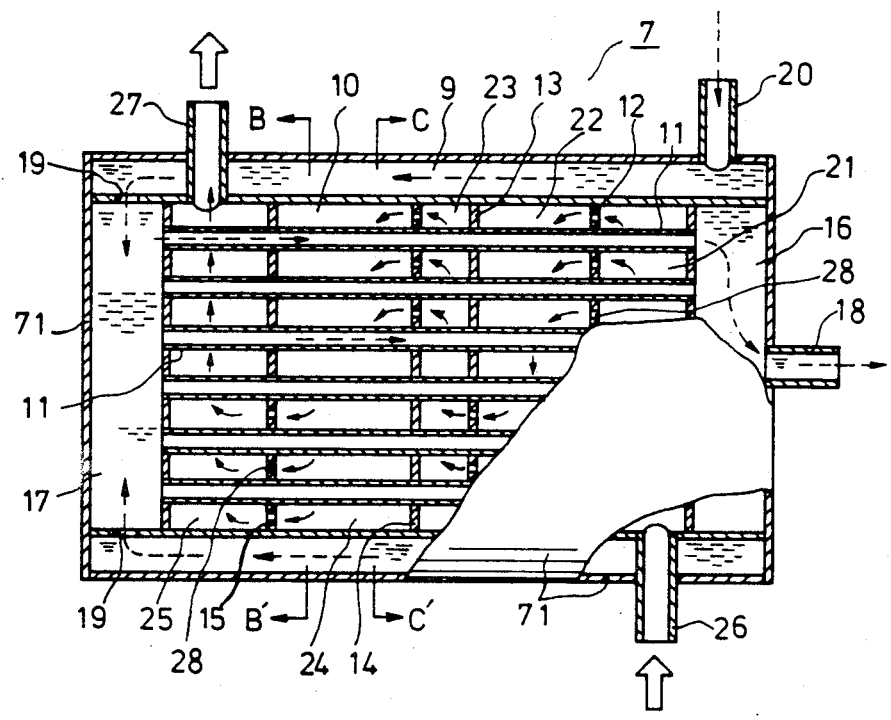
FIG. 2 is a sectional side view of the heat exchanger of the first embodiment of the present invention.

An internal combustion engine 1, for instance, using gas fuel, such as city gas or liquid fuel such as light oil, is used to drive a compressor 2. The compressor 2, a condenser 3, an expansion valve 5 and evaporator 4 are connected in series with respect to refrigerant circuit, to constitute a refrigeration cycle for use as positive and negative heat source, for instance, air conditioning (cooling and heating) water heating or the like. In general, heat efficiency of the internal combustion engine is about 30%. The remaining energy, i.e., heat is collectable by means of exhaust-heat collecting system utilizing the heat exchanger 7, and a cylinder head 6 of the internal combustion engine 1, and accordingly about 50% of the energy of the fuel is collected by the heat collecting system in which the heat exchanger in accordance with the present invention is applied. The collected heat is, for instance, stored in a heat reservoir 8 or directly used in air conditioning. In the end, only about 20% of the energy of the fuel is lost mainly as heat loss through a final exhaust gas and conduction or by radiation from the system. In such system, the total efficiency of the energy utility becomes, in case of cooling about 1.0, and in case of water-heating about 1.5, when efficient heat pump system, as well as, efficient heat exchanger in accordance with the present invention are utilized in such system, wherein hot water is used in a air-conditioning system or in a hot water-supply system. In such system using an internal combustion engine as, for instance, used in home use air conditioning or the like, considerable noise is produced. And accordingly, in order to decrease such noise to a very low level permissible in a residence area for long time use, a very efficient noise suppressing system is necessary, and further, such system must be very compact. FIG. 2 shows a first embodiment in sectional side view and FIG. 3 and FIG. 4 in sectional rear and front views at the sectional planes B—B' and C—C', respectively.

Figure 3:
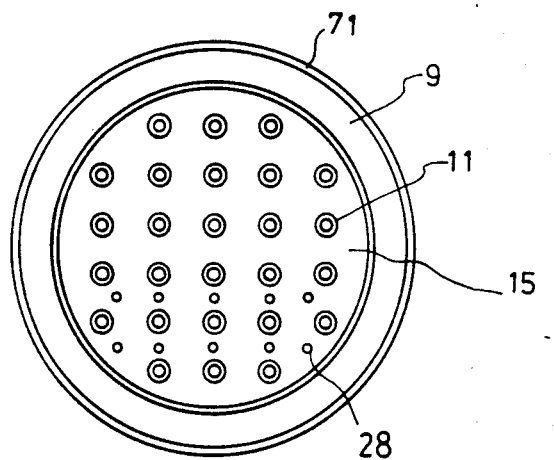
FIG. 3 is a sectional rear view at B—B' section of FIG. 2.
Figure 4:
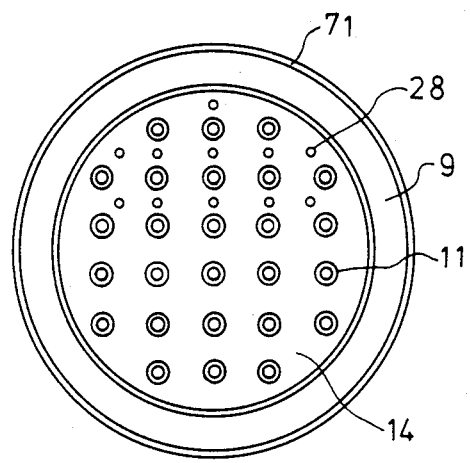
FIG. 4 is a sectional front view at C—C' section of FIG. 2.

The heat exchanger 7 shown in FIG. 2 comprises a casing 71, a water jacket 9 disposed immediately inside the outer shell of the casing 71 thereby to surround the inside space as a gas flow space 10. The casing also has an inlet header 17 and an outlet header 16 which are connected each other by a number of heat exchange tubes 11 passing through the gas flow space 10. The shape of the casing 71 or jacket 9 is not necessarily of round cylindrical transverse cross-sectional figure, but may be of prismatic figure with a polygonal transverse cross-sectional figure if necessary. The inside space 10 is partitioned the longitudinal direction of the heat exchange tubes 11 by several vertical partitions 12, 13, 14 and 15, through which the heat exchange tubes 11 penetrate. The inlet header 17 is connected by several connecting holes with the water jacket 9 and an inlet 20 is connected to the water jacket 9. On the other hand, an outlet 18 is connected to the outlet header 16. The partitions 12, 13, 14 and 15 have several gas-passing connection holes 28 at predetermined positions as shown in FIG. 3 and in FIG. 4. The small gas-passing connection holes 28 and partitioned spaces 25, 10, 23, 22 and 21 constitute expansion type noise suppressing means. And therefore, the volume of spaces and number and section areas of the connection holes are designed by considering noise suppressing characteristics. As shown in FIG. 3 and in FIG. 4, neighboring partitions 14, 15 have the gas-passing connection holes in opposite parts, that is, one on the lower part and the other on the upper part. Alternatively, the different dispositions of the gas-passing connection holes may be: one on the left part of a partition and the other on the right part of the neibouring partition.

Operation of the above-mentioned heat exchanger in accordance with the principles of the present invention proceeds as follows.

The liquid to be heated, for instance, water is led in the water jacket 9 through the inlet 20, and flows in the inlet header 17 through the holes 19. Then the liquid further flows through the heat exchange tubes 11 into the outlet header 16 and is led outside through the outlet 18.

On the other hand, a heating gas, for instance, exhaust gas from an internal combustion engine, is led through the gas inlet 26 into the first partitioned gas flow space 21. The gas is then led into the next partitioned gas flow space 22 through the gas-passing connection holes 28 of the first partition 12. Thereafter, in the similar way the gas is led through the gas-passing connection holes of respective partitions 13, 14 and 15, and finally is led out through the gas outlet 27. When the gas is flowing through the gas flow spaces 21, 22, 23, 24 and 25, and when the water is lead through the heat exchange tubes 11, outside faces whereof are exposed in the gas flow spaces, the heat of the gas is transferred to the water through the walls of the heat exchange tubes 11. In order to make the heat exchange efficient, the general direction of the gas flow and the flow in the heat exchange tubes of the liquid are selected to be in substantially counter flow.

As a result of the above-mentioned operation and configuration and operation, the exhaust gas from the internal combustion engine is abruptly expanded in the first partitioned gas flow space 21, and then is abruptly compressed at the gas-passing connection holes 28, and thereafter again abruptly expanded in the next gas flow space 22, and further is abruptly compressed at the gas-passing connection hole 28 of the next partition. And the above steps are repeated until at last the gas goes out through the outlet 27. Accordingly this heat exchanger 7 operates as multiple stage expansion type noise suppressor. Furthermore, by means of the pulsive nature of the exhaust gas the gas does not make a boundary layer around the heat exchange tubes 11, nor make undesirable laminar flow which is disadvantageous for heat exchange, and therefore an efficient heat exchange is attained besides efficient noise suppressing. Furthermore, since the gas flow spaces 10, which are noise suppressing spaces, are entirely surrounded by water jacket 9, the inlet header 17 and the outlet header 16, which are filled with water, and hence have a considerable mass, the exhaust gas having the combustion noise is entirely isolated from the outside face of the casing 71, and thereby having superior noise suppressing effect is attainable.

Figure 5:
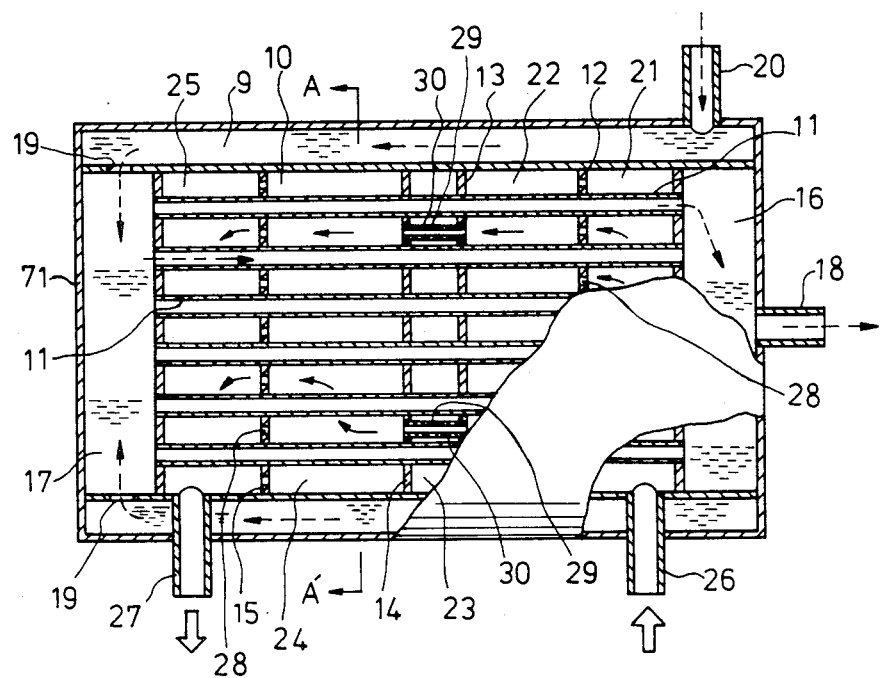
FIG. 5 is a sectional side view of a second embodiment of the present invention wherein a resonance space 23 is provided.

FIG. 5 shows a second embodiment, wherein the partitioned space, preferably that of the central part 23, is formed as a resonance space. Resonance frequency of the resonance space 23 is selected to be a central frequency of a major frequency component of the noise of the gas. The resonance space 23 is defined by a pair of partitions 13 and 14 which have no gas-passing connection hole other than those connected to the gas flow pipes 30. And the gas-passing pipes 30 have a predetermined number of small holes 29 for connection to the resonance space 23 therethrough. Other parts and components than the above-mentioned parts and components are substantially identical to corresponding parts of the aforementioned first embodiment, therefore no explanation of the configuration and operation of the identical parts and components is repeated.

The above-mentioned second embodiment has satisfactory noise suppressing effect for noise components having frequencies around the resonance frequency, and thus by selecting the resonance frequency around the central frequency of the major frequency component of the noise, a satisfactory noise suppressing effect is attainable.

Figure 6:
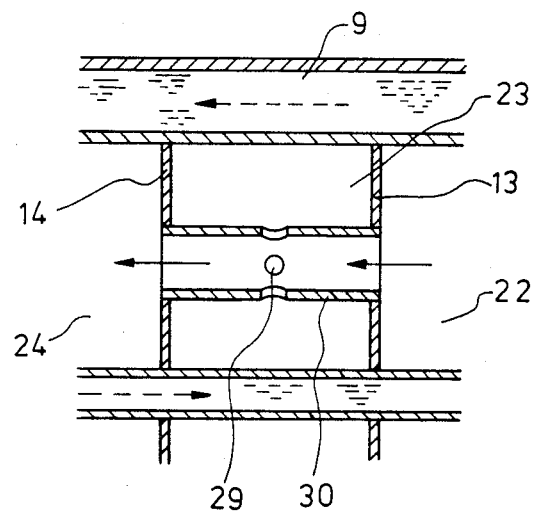
FIG. 6 is a enlarged sectional view of a part of the resonance space of FIG. 5.
Figure 7:
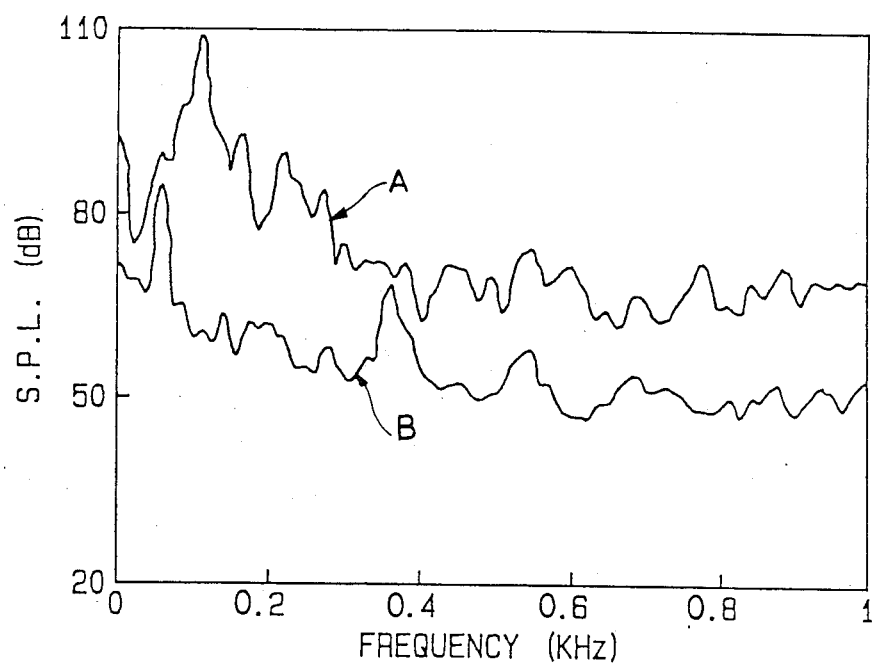
FIG. 7 is a graph showing the noise suppressing characteristic of the embodiment of FIG. 5 and FIG. 6.

FIG. 7 shows an experimental result of noise reduction in accordance with the present invention, namely resulting from application of the present embodiment to an actual 4-cycle internal combustion engine of the embodiment of FIG. 5 and FIG. 6. In the graph of FIG. 7, curve A shows a spectal distribution of noise of the engine without using the heat exchanger of FIG. 5 and FIG. 6, and curve B shows the frequency distribution of noise after muffling by the heat exchanger of FIG. 5 and FIG. 6. As shown in FIG. 7, the curve A for the non-suppressed noise has a sharp peak around at 100 Hz, but the curve B for the application of the embodiment of FIG. 5 and FIG. 6 has well suppressed frequency components at about 100 Hz. As an average, noise of the combustion engine exhaust gas is decreased by about 25 dB(A), which shows that the noise suppressing effect of the heat exchanger of the present invention is very superior.

Figure 8:
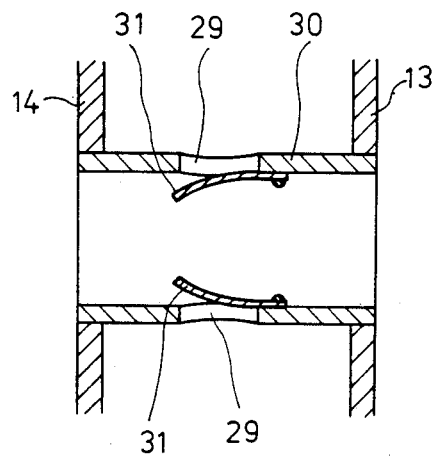
FIG. 8 is an enlarged sectional view of a part of a resonance space of a modified configuration of the embodiment of FIG. 5 and FIG. 6.

FIG. 8 shows a third embodiment which is provided with means to respond variation of engine revolution speed in the resonance type noise suppresser.

In a type of gas engine heat pump system, the revolution speed of the internal combustion engine varies responding to variation of thermal load of the air conditioning system or water heating system. In such a system when revolution speed of the engine rises, the main component of the noise of the engine shift to higher frequency. Accordingly the resonance type noise suppressing means should preferably change its resonance frequency. The embodiment of FIG. 8 changes the resonance frequency by adopting reed valve 31 which automatically changes the resonance frequency responding to the state of operation of the engine. As shown in FIG. 8, which is an enlarged sectional view of the gas flow pipe 30 of the resonance space 23, a reed valve is fixed on the inside face of the small holes 29, so as to cover the small hole when the reed valve is extended straight. The reed valve is made of a temperature-responding metal such as a bimetallic strip, and is designed to move in a direction to open the hole 29 when ambient temperature rises. Other parts and components than the above-mentioned parts and components are substantially identical to corresponding parts of the aforementioned first embodiment, therefore no explanation on the configuration and operation on the identical parts and components are repeated.

Figure 9:
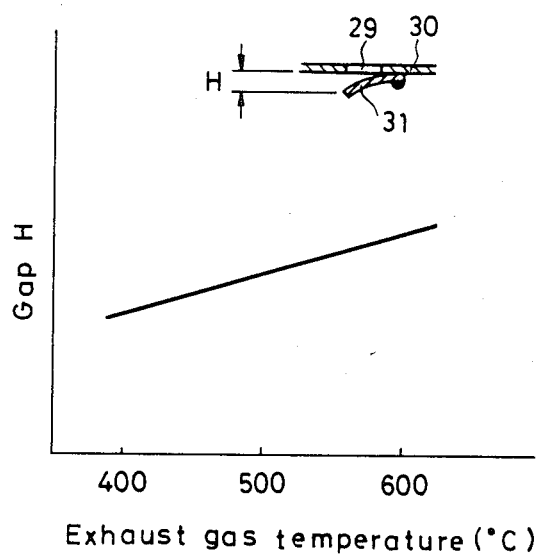
FIG. 9 and FIG. 10 are graphs for explaining the operation of the modified embodiment of FIG. 8.
Figure 10:
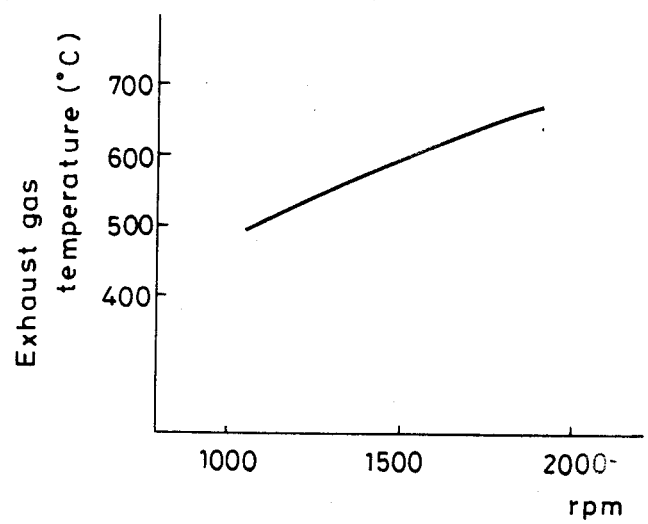

Operation of the third embodiment is that, when the load of the system increases, the revolution speed of the engine increases, thereby raising temperature of the exhaust gas as shown in the characteristic curve of FIG. 10. As a result of the temperature rise of the exhaust gas, the reed valve 31 moves in a direction to open the hole 29 as shown in the characteristic curve of FIG. 9. Then, as a result of the moving of the reed valve 31, the effective area of the small hole 29 increases, and therefore the effective resonance frequency of the resonance space 23 changes. In actual design, when the engine revolution speed increases and hence the temperature of the exhaust gas rises, the reed valve 31 should move to increase effective section area of the small hole 29 in a manner to increase the resonance frequency in accordance with the known relation given by the following equation:

$$f_p = \frac{C}{2\pi} \cdot \sqrt{\frac{nS_p}{V_p l_p}} ,$$

wherein,

C is speed of sound wave in the gas, $S_p$ is the area of the hole 29, $l_p$ is the thickness of gas passing pipe 30 at the part of the hole, n is number of holes in the gas passing pipe 30, $V_p$ is the volume of the resonance space, and $f_p$ is the resonance frequency.

Thus, this embodiment can achieve satisfactory noise suppression as a result of appropriate change of resonance frequency of the resonance space 23 responding to change of revolution speed of the engine.

Figure 11:
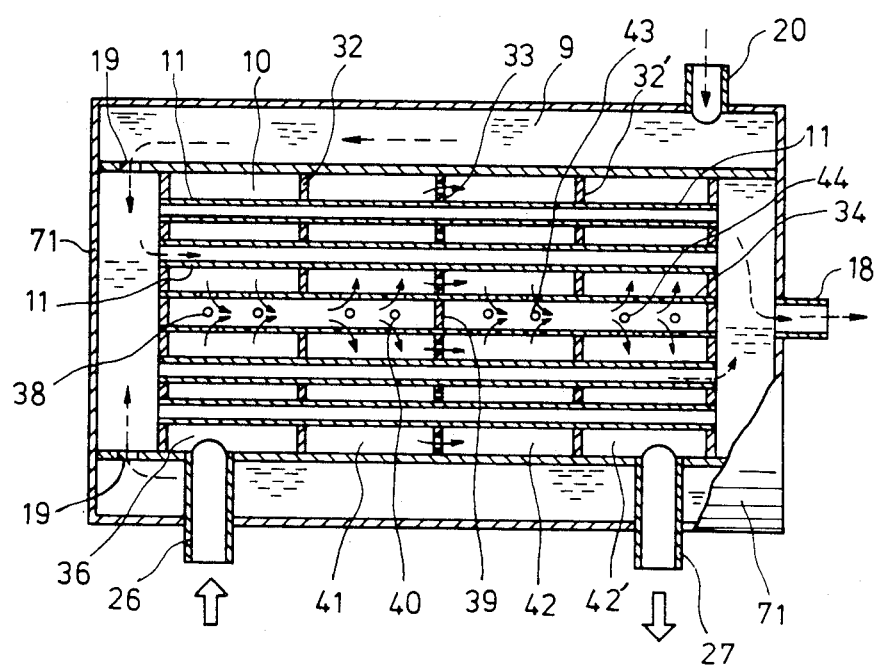
FIG. 11 is a sectional side view of a fourth example in accordance with the present invention.

FIG. 11 shows a fourth embodiment in accordance with the present invention, wherein the noise suppressing characteristic and the heat exchange characteristic are further improved. Other parts and components than the above-mentioned parts and components are substantially identical to corrensponding parts of the aforementioned first embodiment, therefore no explanation of the configuration and operation of the identical parts and components are repeated.

In this example, the gas flow space 10 is divided into four spaces by three partitions 32, 33 and 32'. The partition 33 has small gas passing connection holes 28 but the partitions 32 and 32' have no connection holes on the face as such of the partitions; but instead, a gas flow pipe 34 is provided in the gas flow space 10, and the gas flow pipe has many small holes 38, 40, 43, 44, which serve as the gas passing connection holes in the previous embodiments. The gas flow pipe 34 is divided into two parts by a central partition 39. Of course, the gas flow pipe 34 may be constituted with two (left and right) pipes divided by the central partition 39. Therefore the first gas flow space 36 is connected to the inside space of the gas flow pipe 34 through the small holes 38. Then the inside space of the gas flow pipe 34 is connected to the second gas flow space 41 by the small holes 40. And the second gas flow space 41 is connected to the third gas flow space 42 by gas passing connection holes 28 on the central partition 33. And the third gas flow space 42 and the fourth gas flow space 42' are connected by the right side part of gas flow pipe 34 through gas passing connection holes 43 and 44 thereon.

The operation of this fourth embodiment is that, the hot gas is led in through the inlet 26 into the first gas flow space 36 and flowing through left side of the gas flow pipe 34 flows into the second gas passing space 41, and then flows into the third gas flow space 42 through the gas passing small holes 33, and then passing through the right side of gas passing pipe 34 through the gas passing small holes 43 and 44 flows into the fourth gas flow space 42' and then finally is led out through the gas outlet 27.

In this embodiment, the hot gas collides with inside walls and heat exchange tubes 11 led in the gas flow pipe 34 being compressed at the small gas passing holes 38 and then is expanded at the small gas passing holes 40 and collides with the heat exchange tubes and inside walls of the second gas flow space. Then, the gas collides with the partition 33 and after being compressed at the small gas passing holes 28 in the central partition 33 and then collide with the heat exchange tubes 11 in the third chamber; and the same sequence repeated in the third gas flow space 42 and the fourth gas low space 42'. Since the hot gas collides many times with the heat exchange tubes 11 and the liquid jacket 9, heat exchange is efficiently carried out. The configuration of this fourth embodiment provides multi-stage compression and expansion of the hot gas, that is, abrupt compression at the holes 38, 41, 28, 43 and 44, and abrupt expansion after every passing of the above-mentioned small holes. Accordingly, the embodiment effectively constitutes a six stage expansion type muffler, and the exhaust gas noise is drastically curtailed. Furthermore, at every stage of the above-mentioned substantial six-stage expansion type muffler, all stages being of side-wall input and side-wall output type, which has a good sound suppression characteristic.

Furthermore, since the gas outlet 27 is provided in a radially outside position with respect to the gas flow pipe 34, the hot gas blowing out from the small holes 40' of the gas flow pipe 34 collide with the inside walls of the gas flow space 42' or surface of the heat exchange tubes 11 at right angles at a high speed, forming of an undesirable boundary layer is suppressed and satisfactorily efficient heat conduction is attainable.

Figure 12:
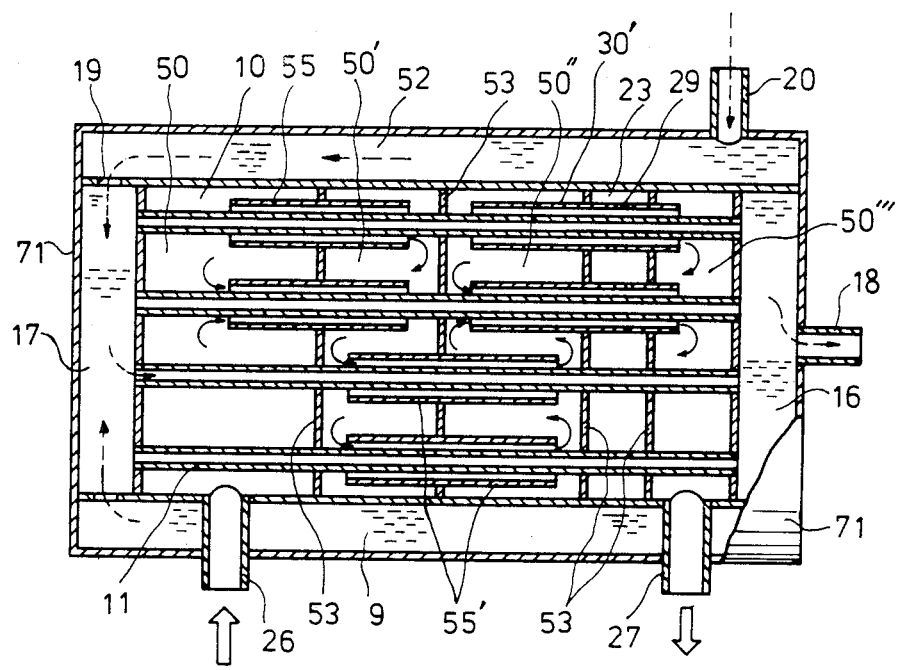
FIG. 12 is a sectional side view of a fifth embodiment in accordance with the present invention.

FIG. 12 is a sectional side view of a fifth embodiment in accordance with the present invention, wherein gas flow pipes 55 connecting a neighbouring two partitioned gas flow spaces are provided coaxially embracing the heat exchange tubes 11 therein. Other parts and components than the above-mentioned parts and components are substantially identical to corresponding parts of the aforementioned first embodiment, therefore no explanation of the configuration and operation of the identical parts and components is repeated.

In this embodiment, partitions 53 have gas passing connection holes only around the heat exchange tubes 11. The gas flow pipes 55 are disposed in a manner to coaxially embrace the heat exchange tubes 11 therein with gas passing connection holes of ring-shaped section therebetween. And the partition 53 has no simple gas passing connection holes therein. In the resonance space 23, the gas flow pipe 30 is disposed also coaxially with the heat exchange pipe, and both ends of the gas flow pipe 30 are extended to appropriate midway positions in the neighbouring partitioned gas flow spaces 50'' and 50'''.

Operation of the fifth embodiment shown in FIG. 12 proceeds as follows. The hot gas is led through the gas inlet 26 into the first gas flow space 50, and led, through the ring-shaped gap between the gas flow pipe 55 and the heat exchange tube 11, into the second gas flow space 50', and then led into the third gas flow space 50'' through the ring-shaped gap between the gas flow pipe 55' and the heat exchange tube 11. And further, the gas is led to the fourth, i.e., last gas flow space 50''' through the similar ring-shaped gap between the gas flow pipe 30 and the heat exchange tube coaxially disposed therein. Incidentally, the gas flow pipe 30 has a small hole 29 connecting to the resonance space 23. By appropriately selecting the length of the gas flow pipe 55, 55' and 30, and for instance by selecting the end part of the gas flow pipes very close to the partition 53 to form narrow parts, desired abrupt gas compression and abrupt gas expansion is obtainable. By forming such narrow parts at the end of the gas flow pipes 55, 55', and furthermore, by disposing the end parts of the gas flow pipe 55 and the gas flow pipe 55' in opposite position of the gas flow space, the flows of the gas can be made in a zigzag way, making many collisions with the wall or heat exchange tubes. Accordingly, an efficient noise suppressing effect is obtainable. In the above-mentioned configuration, by selecting the inside diameter of the gas passing pipes 55, 55' and 30. The abrupt compressions of the gas and abrupt expansions of the gas when coming into the gas passing space and at going out constitute a multiple stage expansion type muffler. Furthermore, by covering some part of the heat exchange tubes by the gas passing tube, noise reduction effect with respect to the inner tube of muffler is attainable. Furthermore, by suitably selecting the length of the gas flow pipes 55, 55' and 30, noise reduction characteristic for various frequency noises is also attainable. Further, the narrow gap space between the outside gas flow pipe and the inside heat exchange tube induces very high speed of gas flow, and therefore, the formation of boundary layer of the gas is suppressed, and efficient heat conduction is obtainable. By making the gas flow in a zigzag way by providing the gas passing pipes, areas of the metallic components contacting the gas are increased, and therefore its heat conduction is improved.

Figure 13:
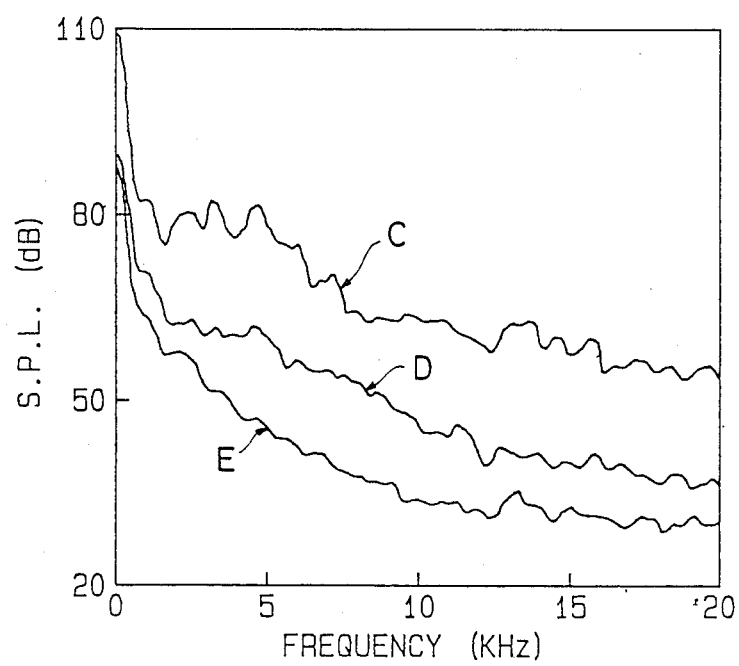
FIG. 13 is a graph comparatively showing noise suppressing characteristic of the embodiment of FIG. 12.

FIG. 13 is a graph comparatively showing noise reduction characteristic of the fifth embodiment adopting the coaxial double pipe configuration, for the frequency range of sound audible to humans. In the graph, curve C is the original noise of an internal combustion gas engine as such, curve D is noise measured when a conventional muffler for an automobile is used for the same engine, and curve E is noise when the heat exchanger of the fifth embodiment in accordance with the present invention is utilized. As shown in the graph of FIG. 13, it is clear that the heat exchanger of the fifth embodiment has superior noise reducing effect for all of the audible range. It was experimentally confirmed that pressure loss, when the heat exchanger of this embodiment is utilized, is only about 100 mm Aq, and such level of pressure loss does not substantially influence the characteristic of the engine operation.

Furthermore, heat a transfer coefficient of the exhaust gas of 70–100 $KCal/m^2 \cdot h \cdot C°$ can be attained.

What is claimed is:

1. A noise-suppressing heat exchanger, comprising:
   wall means, including two opposite header end walls and a perimetrical sidewall, defining an enclosed gas flow space;
   an outer shell completely, spacedly enclosing said wall means of said gas flow space so as to define a liquid jacket substantially completely surrounding said gas flow space;

said wall means including means mechanically supporting said wall means relative to said outer shell;

a plurality of liquid flow pipes extending generally parallel to one another, each having opposite ends opening through respective of said opposite end walls of said wall means, into said liquid jacket;

means defining a liquid inlet through said outer shell into said liquid jacket and a liquid outlet from said liquid jacket through said outer shell, the liquid inlet and liquid outlet being so arranged that a relatively cool liquid which is to be heated may be introduced into the liquid jacket via said liquid inlet, traverse said gas flow space within said tubes while being warmed by indirect heat exchange with a relatively hot gas flowing in said gas flow space, re-enter said liquid jacket and flow out said liquid outlet as a relatively warmed liquid;

means defining a gas inlet through said outer shell, said liquid jacket and said wall means into said gas flow space and a gas outlet from said gas flow space through said liquid jacket and said outer shell, the gas inlet and gas outlet being so arranged that a relatively hot gas which is to be cooled may be introduced into said gas flow space via said gas inlet, traverse said gas flow space externally of said tubes while being cooled by indirect heat exchange with said relatively cool liquid and flow out said gas outlet as a relatively cooled gas;

a plurality of partition walls disposed in said gas flow space at a respective plurality of locations intermediate said two opposite end walls, with said liquid flow pipes penetrating said partition walls; these partition walls, with said wall means, dividing said gas flow space into a plurality of serially adjoining compartments; at least two of said partition walls being so spatially disposed relative to said wall means and to one another as to provide that said compartments of said gas flow space are of at least three different sizes; and means defining at least one small hole through each partition wall, these small holes being so sized and located as to ensure that said gas in traversing said gas flow space must travel externally crosswise as well as externally lengthwise of said liquid flow pipes, and undergo multi-stage expansion, whereby noise emanating from said gas is muffled by a combination of enclosure by said liquid in said liquid jacket, and attenuation by flowing successively through said at least three different-sized compartments.

2. The noise-suppressing heat exchanger of claim 1, wherein:

said liquid inlet and said liquid outlet are so located relative to said gas inlet and said gas outlet as to cause liquid and gas flowing through said liquid flow pipes and gas flow space to flow in counter-current indirect heat exchange relationship with one another.

3. A heat exchanger in accordance with claim 1, wherein said gas flow space comprises noise suppressing means of resonance type.

4. A heat exchanger in accordance with claim 3, wherein said noise suppressing means has at least a pipe with at least a hole, said pipe connecting two spaces on both sides of an isolated space defined by two neighboring partitions.

5. A heat exchanger in accordance with claim 4, wherein said hole has a reed valve which displaces responding to ambient temperature change.

6. A heat exchanger in accordance with claim 1, which further comprises a gas flow pipe connecting neighboring two of said partitioned spaces, said gas flow pipe having at least one hole connected to each of said partitioned spaces, thereby constituting said gas-passing connection holes.

7. A heat exchanger in accordance with claim 1, which further comprises gas flow pipes connecting neighboring two of said partitioned spaces, said gas flow pipes being open to each of said partitioned spaces and being spaced around said heat exchange tubes.

* * * * *